(12) United States Patent
Makino et al.

(10) Patent No.: US 6,674,991 B2
(45) Date of Patent: Jan. 6, 2004

(54) SHEET CONVEYING APPARATUS AND ORIGINAL DOCUMENT PROCESSING APPARATUS

(75) Inventors: Yuichi Makino, Ibaraki (JP); Yuichi Yamamoto, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/933,162

(22) Filed: Aug. 21, 2001

(65) Prior Publication Data

US 2002/0025203 A1 Feb. 28, 2002

(30) Foreign Application Priority Data

Aug. 21, 2000 (JP) ......................................... 2000-249600

(51) Int. Cl.[7] .............................................. G03G 15/00
(52) U.S. Cl. ....................................... 399/374; 358/496
(58) Field of Search .......................... 271/208; 358/496, 358/498; 399/367, 373, 374; 355/23, 24

(56) References Cited

U.S. PATENT DOCUMENTS

| 4,146,326 A | * | 3/1979 | Taylor et al. ................ 271/246 |
| 4,544,148 A | * | 10/1985 | Kitajima et al. ............ 271/3.05 |
| 4,777,498 A | | 10/1988 | Kasamura et al. |
| 4,787,616 A | | 11/1988 | Sasaki et al. |
| 4,799,084 A | | 1/1989 | Koike et al. |
| 4,954,847 A | * | 9/1990 | Murata et al. ............... 271/301 |
| 5,022,640 A | * | 6/1991 | Greco, Jr. ..................... 271/117 |
| 5,082,272 A | * | 1/1992 | Xydias et al. ............... 271/186 |
| 5,784,680 A | * | 7/1998 | Taruki ......................... 271/291 |
| 6,131,898 A | | 10/2000 | Hiroi et al. ............... 271/10.03 |
| 6,307,614 B1 | * | 10/2001 | Gaarder et al. ................ 355/24 |
| 6,354,589 B1 | * | 3/2002 | Taruki et al. .......... 271/265.01 |

FOREIGN PATENT DOCUMENTS

| JP | 60191958 A | * | 9/1985 | ........... B65H/29/22 |
| JP | 2001335177 A | * | 12/2001 | ............ B65H/5/00 |

* cited by examiner

Primary Examiner—Robert Beatty
(74) Attorney, Agent, or Firm—Fitzpatrick, Cella, Harper & Scinto

(57) ABSTRACT

A sheet conveying apparatus has a conveyor for conveying a sheet to a prescribed position, a pair of reverse-discharge rotating members capable of rotating forward and reverse for feeding the sheet to the conveyor by switchback and an electricity removal unit for removing electricity from the conveyed sheet. The switchback serves to feed a sheet having a maximum conveyable length from the pair of reverse-discharge rotating members to the conveyor and the electricity removal unit is arranged downstream in a sheet discharging direction from a cross over position for a front edge of the sheet and a back edge of the sheet during discharge of the sheet, and at a downstream side to the sheet discharging direction of the pair of reverse-discharge rotating members.

14 Claims, 5 Drawing Sheets

SHEET CONVEYING APPARATUS AND ORIGINAL DOCUMENT PROCESSING APPARATUS

BACKGROUND OF THE INVENTION

1. Field of the Invention

This invention relates to a sheet conveying apparatus for a printer, facsimile or the like and an image reading apparatus thereof.

2. Description of Related Art

Conventionally, among an image reading apparatus such as a digital copier, a printer, or a facsimile, there is an original document processing apparatus, such as a sheet conveying apparatus, being openable-closable against an original document table for automatically feeding an original document (a sheet) to an image reading apparatus. The image reading apparatus serves to read an image of the original document by performing exposure upon the original document automatically fed from the original document processing apparatus.

Further, in respect of a discharge portion of the original document processing apparatus, there is one where the sheet is directly discharged after a reading process of an image, and the other is where an original document is switched back after an image of a front side of a double-sided original document is read, and is then further subject to reading of the backside, and is once again switched back and conveyed to be discharged.

A conventional original document processing apparatus having the foregoing structure is shown in FIG. 5. In the drawing, the discharge portion of the original document processing apparatus is structured with a pair of reverse-discharge rollers 201a, 201b for performing a switchback operation and for performing a discharging operation.

During the discharging operation of the original document processing apparatus, the original document is conveyed with a prescribed speed by the conveying portion 203, and then, an image is read at a reading position 204, and then, the original document is guided to a discharge portion 202 by a C-guide 207, and then, the original document is discharged to a discharge tray 205 by a pair of reverse-discharge rollers 201a, 201b.

During the switchback operation of the original document processing apparatus, after the original document is conveyed with a prescribed speed by the conveying portion 203 in the same manner as the above, and after an image is read at a reading position 204, the original document is passed through a primary conveying path R1 and is guided to the discharge portion 202 by a flapper 209 and by the C-guide 207. Then, after a rear edge of the original document passes a reverse-discharge sensor, the pair of reverse-discharge rollers 201a, 201b starts reversal while nipping the original document, and with the work of the flapper 209, the original document is conveyed once again to the conveying portion 203 so as to pass a conveying path R2.

With such structure, when a path of the conveying portion 203 is shortened for size reducing the original document processing apparatus, an original document having a maximum conveyable length would become crossed over at the discharge portion 202 during the switchback conveyance process; accordingly there is an original document processing apparatus where the pair of reverse-discharge rollers 201a, 201b are separably structured.

With such structure, when reading the first surface, the pair of reverse-discharge rollers 201a, 201b are separated before starting the original document reading process. During this process, the reverse-discharge roller 201a serves a driving roller and starts to drive in an original document discharge direction. After the reading of the first reverse discharge rollers 201a, 201b nips the original document, and then, after the rear edge of the original document passes the reverse discharge sensor 208, the pair of reverse discharge rollers 201a, 201b drives in reverse for conveying the original document to the conveying portion 203.

After the switchback where the original document is delivered to the conveying portion 203 by the discharge portion 202, the pair of reverse-discharge rollers 201a, 201b separates and momentarily ceases driving, and then, when the conveying portion 203 delivers the original document until the front edge of the original document reaches the reading position 204 for reading the second surface, the reverse-discharge roller 201a starts driving in the original document discharge direction in the same manner as the reading of the first surface.

After the reading of the second surface, the pair of reverse-discharge rollers 201a, 201b nips and conveys the original document and once again repeats reversal in means to sort the order of the discharged original document and finally completes the reading operation.

During the reading operation, when the original document processing apparatus conveys an original document having a maximum conveyable length, the pair of reverse-discharge rollers 201a, 201b is required to be separated since the front edge of the original document having been switchback conveyed again to the discharge portion 202 and the back edge of the original document being in the midst of switchback conveyance would cross over at the discharge portion 202.

Further, an electricity removal needle 206 is normally disposed near the pair of reverse-discharge rollers 201a, 201b, and serves to remove electric charge of the original document and prevent the matching trouble of the original document caused by electrification.

However, the conventional original document processing apparatus had the following problems during the discharge operation and the switchback operation.

When the path of the conveying portion 203 is shortened for size reduction of the apparatus where the original document processing apparatus conveys an original document having a maximum conveyable length, the front edge of the original document and the back edge of the original document would cross over at the discharge portion 202 during the switchback conveyance. Therefore, the pair of reverse-discharge rollers 201a, 201b are separably structured so that the pair of reverse-discharge rollers 201a, 201b would not affect the front edge of the original document and the back edge of the original document being conveyed in a different direction, respectively.

In such case, the electricity removal needle 206 arranged nearby the pair of reverse-discharge rollers 201a, 201b makes contact with the original document and serves to remove electricity, nevertheless, during a switchback conveyance of the original document having maximum length, one end portion would overlap with the other end portion causing the original document to be discharged without having the front edge of the original document to contact with the electricity removal needle 206 and result to a risk of stacking trouble caused by electrification, due to the fact that the front edge of the original document is released by a nipping portion of the pair of reverse-discharge rollers 201a, 201b and discharged while the rear edge of the original document being in the midst of switchback conveyance would still be left at the discharge portion 202.

It is an object of this invention to solve the foregoing problems by providing a sheet conveying apparatus capable of steadily removing electricity from a sheet even during a switchback conveyance and to provide an image reading apparatus thereof.

SUMMARY OF THE INVENTION

In means to solve the foregoing problems, this invention proposes a sheet conveying apparatus comprising: a conveying means for conveying a sheet to a prescribed position; a pair of reverse-discharge rotating members capable of rotating forward and reverse for feeding the sheet to the conveying means by switchback; and an electricity removal means for removing electricity from the conveyed sheet; wherein the switchback serves to feed a sheet having a maximum conveyable length from the pair of reverse-discharge rotating members to the conveying means; and wherein the electricity removal means is arranged downstream in a sheet discharging direction from a cross over position for a front edge of the sheet and a back edge o the sheet during discharge of the sheet after having passed the prescribed position, and passed the pair of reverse-discharge rotating members again.

Owing to this invention, removal of electricity for a discharged original document could steadily be performed and stacking performance could be improved by means of feeding a sheet of a maximum conveyable length to a conveying means from a pair of reverse-discharge rotating members by switchback, and arranging an electricity removal means for removing electricity at a position downstream in the sheet discharging direction from the cross over position of the front edge and the rear edge of the original document when being discharged after passing a prescribed position and passing the pair of reverse-discharge rotating members once again.

BRIEF DESCRIPTION OF THE DRAWINGS

The above and other objects and features of the invention are apparent to those skilled in the art from the following preferred embodiments thereof when considered in conjunction with the accompanied drawings, in which.

DESCRIPTION OF THE PREFERRED EMBODIMENTS

Figure 1:
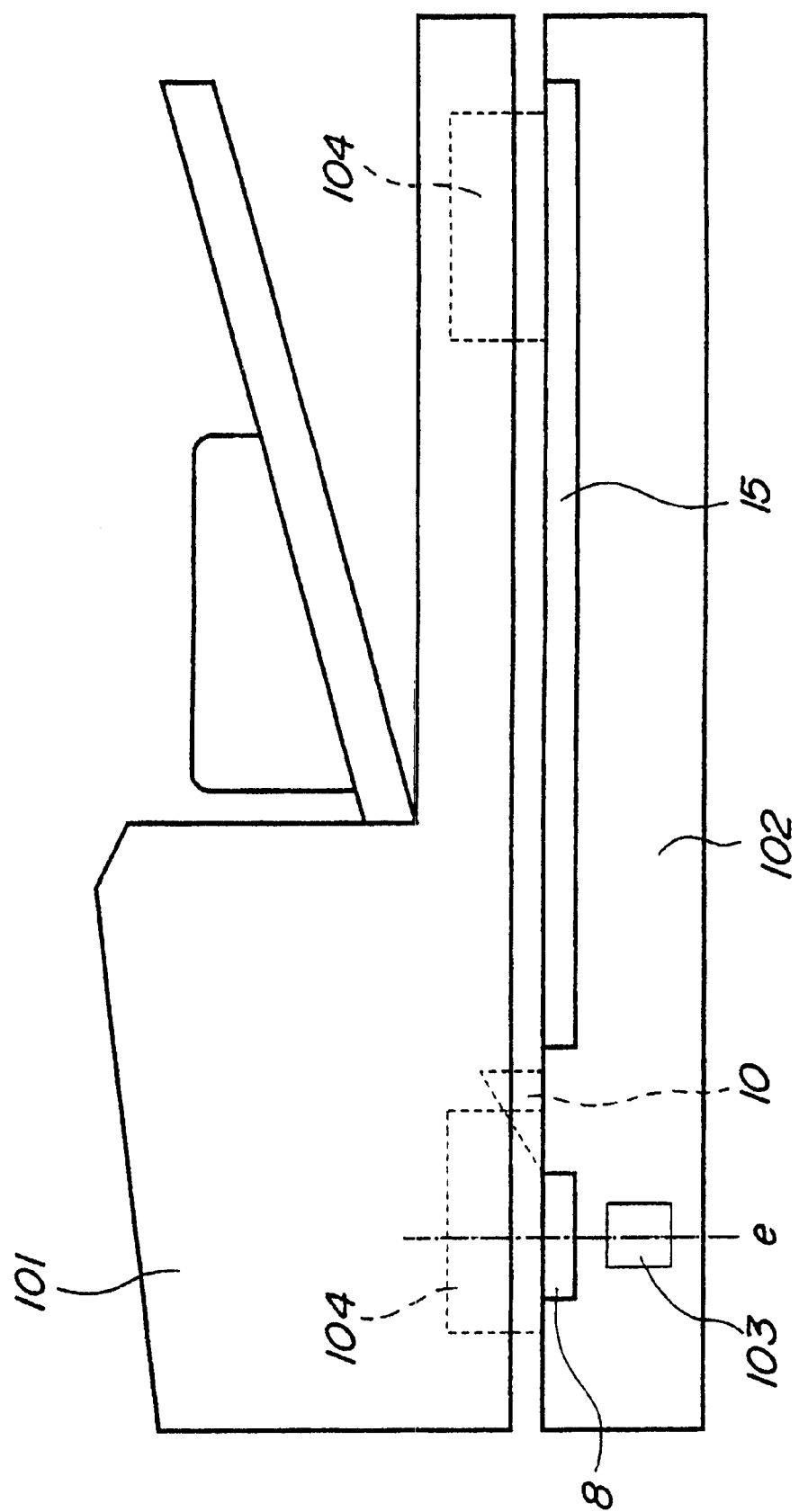
FIG. 1 is a schematic explanatory view showing an image reading apparatus of an embodiment for this invention.
Figure 2:
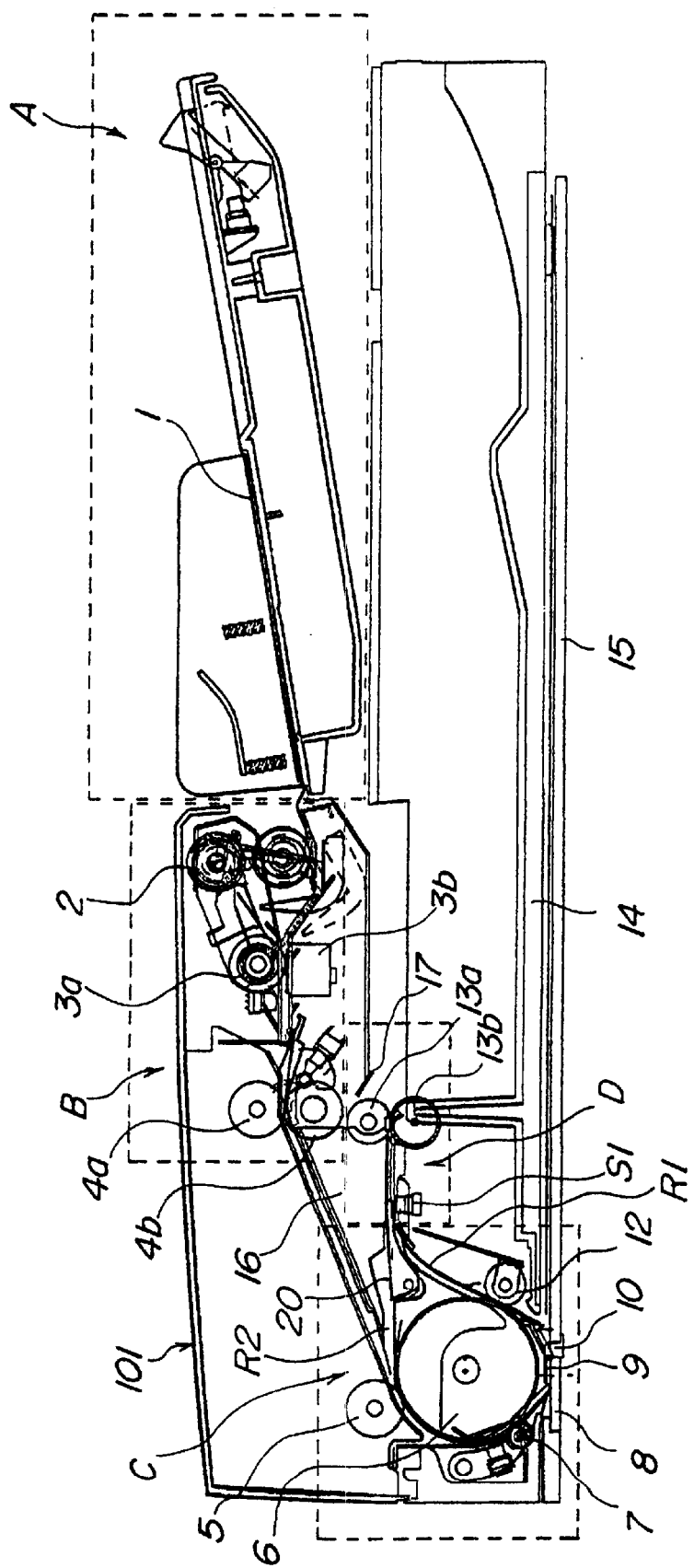
FIG. 2 is a cross sectional explanatory view showing original document processing apparatus of an embodiment for this invention.
Figure 3:
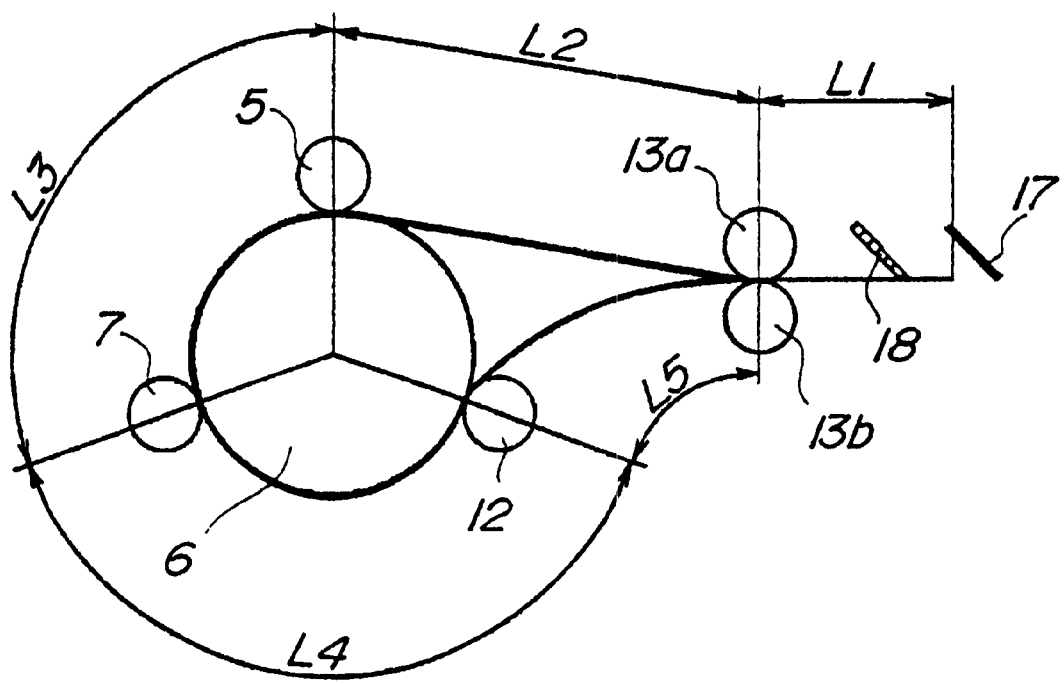
FIG. 3 is an explanatory view showing a switchback conveyance path of an embodiment for this invention.

An original document processing apparatus being an exemplary sheet conveying apparatus of this invention will be used for explaining hereinafter the structures of an original document processing apparatus and an image reading apparatus with reference to FIG. 1 through FIG. 3. FIG. 1 is a schematic explanatory view showing an image reading apparatus; FIG. 2 is a cross-sectional explanatory view showing an original document processing apparatus; and FIG. 3 is an explanatory view of a switchback conveying path.

(Overall Structure)

As for an outlined description, in a manner shown in FIG. 1, the original document processing apparatus 101 is arranged with an image reading apparatus 102 positioned above a hinge portion 104 disposed therebetween, and conveys an original document to a reading position e of the image reading apparatus 102. The image reading apparatus 102 has a small platen glass 8 and a large platen glass 15, a jump stand 10, and an exposure apparatus 103, in which the exposure apparatus 103 performs exposure upon the original document conveyed from the original document processing apparatus 101.

Next, a conveying method of a one-side original document will be described with reference to FIG. 2. An original document stacking portion A has a stacking tray 1, in which the original document is stacked upon the stacking tray 1.

In respect of an original document feeding portion B, a pickup roller 2 draws in a bundle of original documents stacked on the stacking tray 1 toward a separation portion comprised of a feeding roller 3a and a friction separation pad 3b, in which the pickup roller 2 and the separation portion serves to separate an original document placed topmost of the bunch of original documents in a sheet by sheet manner and conveys the original document to a pair of primary register rollers 4a, 4b. The pair of primary register roller 4a, 4b is ceased when the front tip of the original document has reached the pair, and then, after a loop is formed by the conveying of the feeding roller 3a and a slant correction is performed, the original document is passed over a top surface of a C-guide 16, and is conveyed to an original document conveying portion C serving as a conveying means.

In respect of the original document conveying portion C, the original document conveyed from the original document feeding portion B is then conveyed with a prescribed speed between the small platen glass 8 and a white panel 9 by a lead roller 6, a secondary register roller 5, a primary leading roll 7, and a secondary lead roll 12. During this process, the exposure apparatus 103 is stationed at a prescribed position on the small platen glass, that is, below the reading position e, so as to perform exposure.

During the exposure, the tip of the original document is guided at a bottom surface of the C-guide 16, and is guided to a nipping portion of a pair of reverse-discharge rollers 13a, 13b serving as a pair of reverse-discharge rotating members for a original document discharge portion D.

In respect of the original document discharge portion D, the pair of reverse-discharge rollers 13a, 13b are separated during the exposure performed at the reading position e, nevertheless, after the rear edge of the original document has passed the reading portion e and the reading process is completed, the reverse-discharge roller 13b moves upward, the reverse-discharge roller 13a and reverse-discharge roller 13b nips the original document, and the original document showing a backside of the original document is discharged upon a discharge tray 14 of a discharge stacking portion E.

(Reading of Double-sided Original Document)

Next, an embodiment of a structure for conveying a double-sided original document will be described. First, the original document stacked on the original document stacking portion A is separated sheet by sheet by the original document feeding portion B and is conveyed to the original document conveying portion C. In the same manner as the aforementioned one-side reading at the original document conveying portion C, the original document is conveyed with a prescribed speed between the small platen glass 8 and a white panel 9 in a direction of the original document discharge portion D. During this process, the exposure apparatus 103 is stationed below the reading position e so as to perform exposure for the first side of the original document.

In respect of the original document discharge portion D, the original document is guided to a primary conveying path R1, and when the rear edge of the original document passes a position of reverse-discharge sensor S1, the pair of reverse-discharge rollers 13a, 13b are reversed by the signal from the reverse-discharge sensor S1 having detected the passing of the original document. Subsequently, owing to the work of the a flapper 20, the original document is guided to a secondary conveying path R2, and the original document is switched back and conveyed to the secondary register roller 5 of the original document conveying portion C being positioned in an opposite direction of the discharging direction. In this process, the secondary register roller 5 is ceased when the front tip of the original document has reached the secondary register roller 5, and then, after a loop is formed by the driving of the pair of reverse-discharge rollers 13a, 13b and a slant correction is performed, the original document is conveyed to the original document conveying portion C. At the original document conveying portion C, in the same manner as the first surface, exposure upon the second surface is performed and the original document is again conveyed to the original document discharge portion D.

In respect of the original document discharge portion D, owing to the structure of the original document processing apparatus 101 of this embodiment, the original document would be in a face-up manner after the second surface has been read and would cause disarrangement in the order of discharged original documents; subsequently, the reversal would be required to be performed again.

Accordingly, in respect of the original document discharge portion D, when the rear edge of the original document passes the position of the reverse-discharge sensor S1, the pair of reverse-discharge rollers 13a, 13b are reversed by the signal from the reverse-discharge sensor S1 having detected the passing of the original document, and the original document is again conveyed in the direction of the original document conveying portion C. In such process, since only a reversal of the original document surface is performed for enabling the original document to be discharged with the backside of the original document facing upward, the secondary register roller 5 does not perform slant correction.

The original document having passed the original document conveying portion C is thrice conveyed to the original document discharging D, and the pair of the reverse-discharge rollers 13a, 13b nips the original document, and the original document showing a backside is discharged upon a discharge tray 14 of a discharge stacking portion E.

(Drive Control for Reverse-Discharge Roller)

Next, a pair of reverse-discharge rollers for drive control regarding this embodiment will be explained. As described above, the pair of reverse-discharge rollers 13a, 13b arranged at the original document discharge portion D is capable of rotating forward and reverse, and further, is structured for being able to attach and separate by solenoid.

During conveying of a double sided original document, and especially during conveying of an original document having a maximum conveyable length, the original document processing apparatus 101 is structured with a separable pair of reverse-discharge rollers 13a, 13b and performs switchback conveyance where the front edge of the original document and the rear edge of the original document would cross over each other between the reverse-discharge roller 13a and the reverse-discharge roller 13b.

In detail, first, in the process of reading the first surface, the pair of reverse-discharge rollers 13a, 13b are separated during the start of the original document reading process. After the image reading process of the first surface, in other words, after the rear edge of the original document has passed the reading position e, the pair of reverse-discharge rollers 13a, 13b nips and maintains the original document, and conveys the original document to the original document discharge portion D in a nipping manner.

Then, after the rear edge of the original document passes the reverse-discharge sensor, the pair of reverse-discharge rollers 13a, 13b are driven in reverse in a direction toward the original document conveying portion C by the signal from the reverse-discharge sensor S1 having detected the passing of the original document, and a switchback conveyance of the original document toward the original document conveying portion C is performed owing to the work of the flapper 20.

After the original document is delivered to the original document conveying portion C, in other words, after the original document is nipped and conveyed to the lead roller 6 and the secondary register roller 5, the pair of reverse-discharge rollers 13a, 13b would separate and cease driving. Although the reading procedure of the second surface is performed at the original document conveying portion C, the pair of reverse-discharge rollers 13a, 13b would maintain the cease of driving during the reading process.

Then, at the time when the rear edge of the switchback conveyed original document has been released from the pair of reverse-discharge rollers 13a, 13b, the pair of reverse-discharge rollers 13a, 13b would start driving toward the original document discharging direction, and would attach to each other so as to nip and convey the original document.

In the same manner, in means to discharge the original document in a face-down manner, the reversing process is repeated once more, and then, the original document is discharged to the discharge stacking portion E.

Accordingly, in the foregoing switchback conveying process, since the pair of reverse-discharge rollers 13a, 13b would cease driving until the original document conveyed by the lead roller 6 is released from the pair of reverse-discharge rollers 13a, 13b, the lead roller 6 and the pair of reverse-discharge rollers 13a, 13b would not pull the original document from each other. Therefore, an increase of conveying load could be prevented and a size reduction of a motor could be allowed.

(Structure for Electricity Removal)

Next, a structural arrangement of an electricity removal means for removing electricity of the discharged original document will be explained.

As described above, during conveying of an original document having a maximum conveyable length, the original document processing apparatus 101 is structured with a separable pair of reverse-discharge rollers 13a, 13b and performs switchback conveyance where the front edge of the original document and the rear edge of the original document cross over each other at the original document discharge portion D. Then, the discharge original document is contacted with a electricity removing needle 17 serving as a electricity removing means; this results to a removal of electricity of the original document and an improvement in stacking performance.

The electricity removal needle 17 of this embodiment is arranged in a position shown in FIG. 3. The following structure is selected so as to avoid stacking trouble where the front edge of the original document would not contact with the electricity removal needle 17 when crossing over during the switchback conveyance process, and to avoid trouble where the original document is electrified due to lack of electricity removal. In other words, the position of the electricity removal needle 17 is to be specified. In a case where the distance between the electricity removal needle 17 and the pair of reverse-discharge rollers 13a, 13b is L1, the distance between the pair of reverse-discharge rollers 13a, 13b and the secondary register roller 5 on the lead roller 6 is L2, the distance between the secondary register roller 5 and the primary register roll 7 is L3, the distance between the primary lead roll 7 and the secondary lead roll 12 is L4, and the distance between the secondary lead roll 12 and the pair of reverse-discharge rollers 13a, 13b is L5, the cross over position of the front edge and the read edge would be defined at an upstream side of the electricity removal needle 17, and the electricity removal needle 17 would be arranged downstream in the sheet discharging direction from the cross over position of the original document, by means of setting the length of a switchback conveyance path (L1, L2, L3, L4, L5) in relation with a maximum original document length L into L<2L1+L2+L3+L4+L5. In other words, by adjusting the total length of the switchback conveyance path, the cross over position of the front edge and the rear edge when conveying a original document of maximum original document length would be defined to be positioned between the electricity removal needle 17 and the pair of reverse-discharge rollers 13a, 13b.

Accordingly, when the electricity removal needle 17 contacts the front edge of the conveyed original document, the rear edge of the original document would not cover such contacting portion, and the entire discharged original document could securely contact the electricity removal needle 17 and remove electricity, and stacking performance could be improved.

It is now to be noted that in order to securely remove electricity when conveying an original document of a small size, an electricity removal needle 18 serving as a second electricity removal means could be disposed between the electricity removal needle 17 and the pair of reverse-discharge rollers 13a, 13b.

Figure 4:
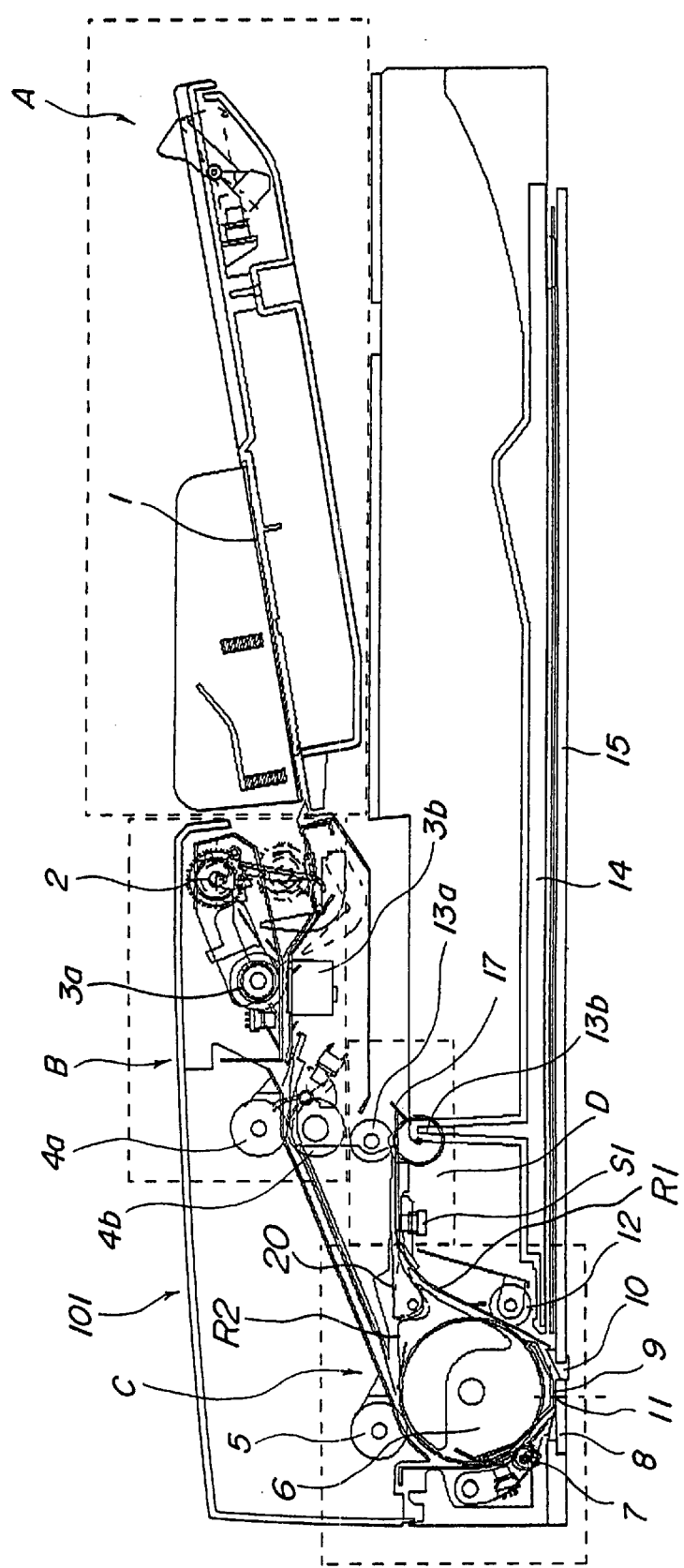
FIG. 4 is a cross sectional explanatory view showing an original document processing apparatus of an embodiment for this invention.
Figure 5:
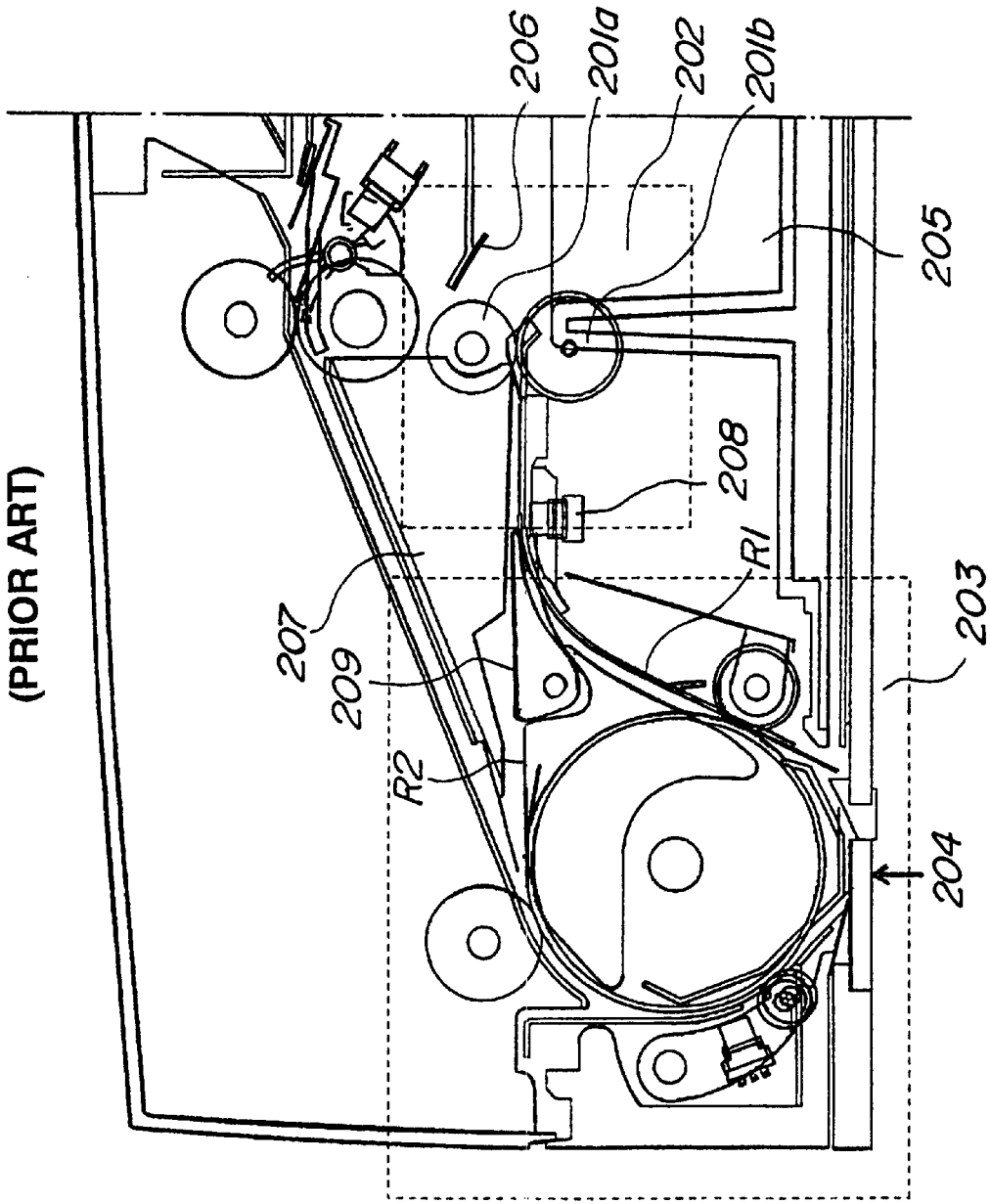
FIG. 5 is a cross sectional explanatory view showing a conventional original document processing apparatus.

In FIG. 4, another embodiment of this invention regarding an original document processing apparatus is shown. Although the electricity removal needle 17 in the aforementioned embodiment is arranged above the original document, the electricity removal needle 17 for this embodiment is arranged below the original document. It is now to be noted that also in this embodiment, the front edge of the original document would not overlap with the rear edge and a state of no electricity removal for the entire original document could be prevented, by disposing the electricity removal needle 17 downstream in the sheet discharging direction from the cross over position of the front edge and the rear edge of the original document.

Although an original document processing apparatus is given as an example of a sheet conveying apparatus in the foregoing embodiment, it should now be noted that a sheet conveying apparatus being a recording apparatus capable of double-side printing could also be used by arranging a recording means such as a recording head, instead of a reading means.

Since this invention is thus structured, removal of electricity for a discharged original document could steadily be performed and stacking performance could be improved by means of feeding a sheet of a maximum conveyable length to a conveying means from a pair of reverse-discharge rotating members by switchback, and arranging an electricity removal means for removing electricity at a position nearer toward the sheet discharging direction than the cross over position of the front edge and the rear edge of the original document when being discharged after passing a prescribed position and passing the pair of reverse-discharge rotating members again.

What is claimed is:

1. A sheet conveying apparatus comprising:

conveying means for conveying a sheet to a prescribed position;

a pair of reverse-discharge rotating members capable of rotating forward and reverse for feeding the sheet to said conveying means by switchback, and discharging the sheet conveyed from said conveying means; and electricity removal means for removing electricity from the conveyed sheet;

wherein the switchback serves to feed a sheet from said pair of reverse-discharge rotating members to said conveying means; and wherein said electricity removal means is disposed at a downstream side in a sheet discharging direction from a cross over position for a front edge of the sheet and a rear edge of the sheet in a case of conveying the sheet having maximum conveyable length by switchback, and at a downstream side in the sheet discharging direction of said pair of reverse-discharge rotating members.

2. The sheet conveying apparatus according to claim 1, wherein said electricity removal means and said pair of reverse-discharge rotating members have a secondary electricity removal means disposed therebetween.

3. The sheet conveying apparatus according to claim 1 or claim 2, wherein said electricity removal means is disposed above the conveyed sheet.

4. The sheet conveying apparatus according to claim 1 or claim 2, wherein said electricity removal means is disposed below the conveyed sheet.

5. An image reading apparatus for conveying a sheet and for reading an image written on the sheet, the image reading apparatus comprising:

the sheet conveying apparatus described in any one of claim 1 or claim 2; and a reading means for reading an image at the prescribed position of the sheet conveying apparatus.

6. An original document processing apparatus comprising:

conveying means for conveying an original document to an original document reading position;

a pair of reverse-discharge rotating members capable of rotating forward and reverse for feeding the original document to said conveying means by switchback, and discharging the original document conveyed from said conveying means; and electricity removal means for removing electricity from the conveyed sheet;

wherein the switchback serves to feed an original document from said pair of reverse-discharge rotating members to the conveying means; and wherein the electricity removal means is disposed at a downstream side in an original document discharging direction from a cross over position for a front edge of the original document and a rear edge of the original document in a case of conveying the original document having a maximum conveyable length by switcbback, and at a downstream side in the original document discharging direction of said pair of reverse-discharge rotating members and a back edge of said original document, when said original document is passed through said original document reading position in an upside-down manner, in a case where said original document subject of being conveyed by said original document processing apparatus of a maximum conveyable length.

7. The original document processing apparatus according to claim 6, wherein a distance of starting from said pair of reverse-discharge rotating members, passing said original document reading position, and returning back to said pair of reverse-discharge rotating members is made shorter than the maximum conveyable length; and wherein the cross over position is disposed between said reverse-discharge rotating members and said electricity removal means.

8. A sheet conveying apparatus comprising:

conveyor for conveying a sheet to a prescribed position;

a pair of reverse-discharge rotating members capable of rotating forward and reverse for feeding the sheet to said conveyor by switchback, and discharging the sheet conveyed from said conveyor; and electricity removal unit for removing electricity from the conveyed sheet;

wherein the switchback serves to feed a sheet from said pair of reverse-discharge rotating members to said conveyor; and wherein said electricity removal unit is arranged disposed at a downstream side in a sheet discharging direction from a cross over position for a front edge of the sheet and a rear edge of the sheet in a case of conveying the sheet having maximum conveyable length by switchback, and at a downstream side in the sheet discharging direction of said pair of reverse-discharge rotating members.

9. The sheet conveying apparatus according to claim 8, wherein said electricity removal unit and said pair of reverse-discharge rotating members have a secondary electricity removal unit disposed therebetween.

10. The sheet conveying apparatus according to claim 8 or claim 9, wherein said electricity removal unit is disposed above the conveyed sheet.

11. The sheet conveying apparatus according to claim 8 or 9, wherein said electricity removal unit is disposed below the conveyed sheet.

12. An image reading apparatus for conveying a sheet and for reading an image written on the sheet, the image reading apparatus comprising:

the sheet conveying apparatus described in any one of claim 8 or 9; and reading means for reading an image at the prescribed position of the sheet conveying apparatus.

13. An original document processing apparatus comprising:

a conveyor for conveying an original document to an original document reading position;

a pair of reverse-discharge rotating members capable of rotating forward and reverse for feeding the original document to said conveyor by switchback, and discharging the original document conveyed from said conveyor; and electricity removal unit for removing electricity from the conveyed sheet;

wherein the switchback serves to feed on original document from said pair of reverse-discharge rotating members to said conveyor; and wherein said electricity removal unit is disposed at a downstream side in an original document discharging direction from a cross over position for a front edge of the original document and a rear edge of the original document in a case of conveying the original document having a maximum conveyable length by switchback, and at a downstream side in the original document discharging direction of said pair of reverse-discharge rotating members.

14. The original document processing apparatus according to claim 13, wherein a distance of starting from said pair of reverse-discharge rotating members, passing said original document reading position, and returning back to said pair of reverse-discharge rotating members is made shorter than the maximum conveyable length; and wherein said cross over position is disposed between said pair of reverse-discharge rotating members and said electricity removal unit.

* * * * *

UNITED STATES PATENT AND TRADEMARK OFFICE
CERTIFICATE OF CORRECTION

PATENT NO. : 6,674,991 B2
DATED : January 6, 2004
INVENTOR(S) : Yuichi Makino et al.

It is certified that error appears in the above-identified patent and that said Letters Patent is hereby corrected as shown below:

Title page,
Item [56], References Cited, FOREIGN PATENT DOCUMENTS, "JP 60191958 A 9/1985" should read -- JP 60-191958 A 9/1985 --; and "JP 2001335177 A 12/2001" should read -- JP 2001-335177 A 12/2001 --.

Column 2,
Line 2, "serves a" should read -- serves as a --.
Line 4, "first" should read -- first surface of the original document is completed (after the rear edge of the original document has passed the reading portion 204), the pair of --.
Line 63, "result to" should read -- result in --.

Column 3,
Line 22, "o the" should read -- of the --.

Column 4,
Line 38, "Bis" should read -- B is --.
Line 49, "for a" should read -- for an --.
Line 65, "Band" should read -- B and --.

Column 5,
Line 52, "Cis" should read -- C is --.

Column 6,
Line 64, "with a" should read -- with an --; and "as a" should read -- as an --.
Line 65, "results to" should read -- results in --.
Line 66, "electricity of" should read -- electricity from --.

Column 7,
Line 19, "read" should read -- rear --.
Line 29, "a original" should read -- an original --.

UNITED STATES PATENT AND TRADEMARK OFFICE
CERTIFICATE OF CORRECTION

PATENT NO.    : 6,674,991 B2
DATED         : January 6, 2004
INVENTOR(S)   : Yuichi Makino et al.

It is certified that error appears in the above-identified patent and that said Letters Patent is hereby corrected as shown below:

Column 9,
Line 9, "members" should read -- members. --, and "and a back edge of said original" should be deleted.
Lines 10-15, should be deleted.

Signed and Sealed this

Fifteenth Day of June, 2004

JON W. DUDAS
*Acting Director of the United States Patent and Trademark Office*